(12) United States Patent
Fritz-Jung et al.

(10) Patent No.: US 7,585,533 B2
(45) Date of Patent: Sep. 8, 2009

(54) PRESSURE FORMED PET FOOD AND METHOD

(75) Inventors: Cathryn (Kati) Fritz-Jung, Marshall, MN (US); Sandeep Bhatnagar, Ballwin, MO (US); Donald Roland Speck, Festus, MO (US); Karl L. Kettinger, St. Louis, MO (US)

(73) Assignee: Nestec S.A., Vevey (CH)

( * ) Notice: Subject to any disclaimer, the term of this patent is extended or adjusted under 35 U.S.C. 154(b) by 576 days.

(21) Appl. No.: 10/166,888

(22) Filed: Jun. 11, 2002

(65) Prior Publication Data

US 2003/0228409 A1    Dec. 11, 2003

(51) Int. Cl.
*A23L 1/31* (2006.01)
*A23J 3/00* (2006.01)

(52) U.S. Cl. .............. 426/454; 426/615; 426/635; 426/805; 426/646

(58) Field of Classification Search ................ 426/656, 426/805, 454, 615, 635
See application file for complete search history.

(56) References Cited

U.S. PATENT DOCUMENTS

| | | | |
|---|---|---|---|
| 3,899,607 A * | 8/1975 | Miller et al. ........... 426/285 |
| 3,908,025 A | 9/1975 | Miller et al. ........... 426/623 |
| 4,006,266 A | 2/1977 | Bone et al. ........... 426/623 |
| 4,020,187 A | 4/1977 | McCulloch et al. ...... 426/72 |
| 4,055,681 A * | 10/1977 | Balaz et al. ........... 426/656 |
| 4,225,630 A | 9/1980 | Pitchon ............... 426/623 |
| 4,293,979 A * | 10/1981 | Colosimo et al. ....... 425/376.1 |
| 4,310,558 A | 1/1982 | Nahm, Jr. ............. 426/98 |
| 4,315,034 A | 2/1982 | Levinson et al. ....... 426/104 |
| 4,609,558 A * | 9/1986 | Giacone et al. ........ 426/549 |
| 4,910,038 A | 3/1990 | Ducharme ............. 426/641 |
| 5,045,339 A | 9/1991 | Ducharme ............. 426/641 |
| 5,120,565 A | 6/1992 | Lanter et al. .......... 426/623 |
| 5,198,237 A * | 3/1993 | Colosimo et al. ....... 425/113 |
| 5,437,885 A | 8/1995 | Lusas et al. ........... 426/302 |
| 5,501,868 A | 3/1996 | Collings et al. ........ 426/623 |
| 5,527,553 A | 6/1996 | Kazemzadeh .......... 426/302 |
| 5,552,176 A | 9/1996 | Marino .............. 426/641 |
| 5,587,193 A | 12/1996 | Kazemzadeh .......... 426/448 |
| 6,136,353 A | 10/2000 | Munz ................. 426/281 |
| 6,190,591 B1 * | 2/2001 | van Lengerich ........ 264/141 |
| 6,203,825 B1 * | 3/2001 | Hodgkins .............. 426/2 |
| 6,214,403 B1 * | 4/2001 | Broberg et al. ......... 426/549 |
| 6,270,820 B1 * | 8/2001 | Fritz-Jung et al. ...... 426/302 |
| 6,410,063 B1 * | 6/2002 | Jewell et al. ........... 426/2 |

* cited by examiner

*Primary Examiner*—C. Sayala
(74) *Attorney, Agent, or Firm*—K & L Gates LLP

(57) ABSTRACT

A pet food and method for manufacturing pet food is provided. The method includes extruding a base meal formulation, grinding the extruded meal, and pressure forming the ground meal into solid form.

28 Claims, 3 Drawing Sheets

PRESSURE FORMED PET FOOD AND METHOD

BACKGROUND OF THE INVENTION

This invention relates generally to methods for manufacturing pet foods and, more particularly, to manufacturing high protein and fat content dry pet foods.

Pet foods are generally formulated for complete and balanced nutrition of animals. Typically, relative proportions of carbohydrates (such as starch), proteins, and fats in the food ingredients are blended together according to a desired formula, and the blend is moistened and extruded to a desired shape and size. During the extrusion process, the blend is subjected to high temperature, pressure, and shear that results in a continuous plastic melt of polymers which binds together particulate matter as the melt travels down an extruder barrel. When the melt exits an extruder die, the melt is suddenly exposed to atmospheric pressure, and gases formed in the melt are released, thus enabling a porous expanded structure to be formed. The expanded material is cut into smaller pieces and dried to a final moisture content. The cut pieces are coated with fat and palatability enhancers to complete the pet food product.

In the extrusion process, the relative proportions of carbohydrate and protein in a given pet food formulation determine the characteristics of the continuous melt and the binding of materials therein as the food is manufactured, thereby determining the strength and hardness of the extrudate in the manufacturing process. Fats and oils lubricate the compressed polymer mix and modify end product properties and eating qualities of the extruded products. For certain proportions of carbohydrates and protein in a pet food formulation, conventional extrusion processes have proven satisfactory to manufacture dry pet foods.

Recent advances in pet nutrition, however, have made pet food formulas with increased proportions of protein and fat desirable in both special needs diets as well as in starter diets for young pets. High protein and fat pet foods, however, are problematic from a manufacturing perspective. With respect to known extrusion processes, high protein and fat formulas, and the resultant lower carbohydrate content, adversely affect the extrudate so that it will not hold together as it exits the extruder. Solid formation of the pet food product is difficult, and a friable extruded product is produced that is subject to excessive breakage during subsequent processing and handling of the product.

BRIEF DESCRIPTION OF THE INVENTION

In one aspect, a method for manufacturing pet food is provided. The method comprises extruding a base meal formulation, grinding the extruded meal, and pressure forming the ground meal into solid form.

In another aspect, a method for manufacturing dry pet food having a carbohydrate content of about 20 weight % or less is provided. The method comprises batching the ingredients of a meal having approximately 20% or less carbohydrate content by weight, extruding the batched meal into an extrudate meal, grinding the extrudate meal, and pressure forming the ground meal into solid form.

In another aspect, a method for forming a pet food having a protein content of at least about 50 weight % and an overall fat content of less than about 27 weight % is provided. The method comprises extruding a base meal to produce an extrudate, grinding the extrudate meal, adding a binder to the ground meal, and pressure forming the ground meal into solid form.

In still another aspect, a pet food is provided. The pet food has a protein content of at least about 50 weight % and an overall fat content of at least about 16 weight %. The pet food is formed by the process of extruding a base meal formulation, grinding the meal after extruding the meal, and pressure forming the ground meal into solid form.

DETAILED DESCRIPTION OF THE INVENTION

Figure 1:
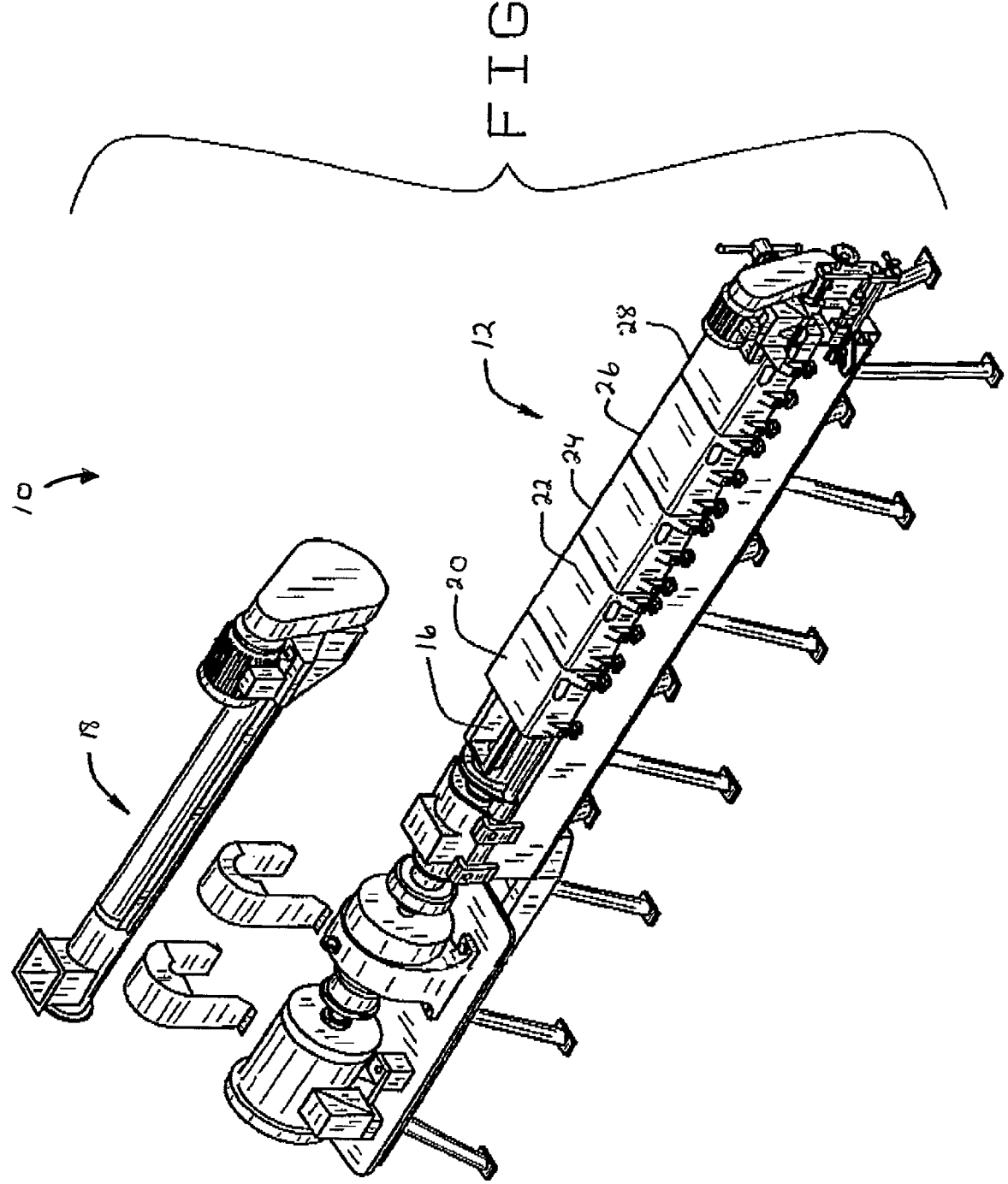
FIG. 1 is schematic diagram of an extrusion apparatus for manufacturing pet food.

FIG. 1 is schematic diagram of an extrusion apparatus 10 which is utilized to manufacture dry pet food. Extrusion apparatus 10 includes an extruder 12 having a barrel 14 with an inlet 16 which receives meal from a preconditioner 18. Extruder 12 has an outlet having a die section coupled thereto as well known in the art. In one embodiment, a hopper is provided to feed pre-mixed pet food formula ingredients prior to entering preconditioner 18. Extruder barrel 14 includes a plurality of barrel sections 20, 22, 24, 26, and 28, although it is understood that greater or fewer barrel sections may be utilized. An elongated bore extends through barrel sections 20, 22, 24, 26, and 28, and one or more rotating, material advancing screws (not shown in FIG. 1) are received in the bore and terminate in the extruder die section.

In use, pet food formulations are conventionally mixed, moistened, and loaded into the hopper which is in flow communication with preconditioner 18. The food formulation mixture is fed from preconditioner 18 into extruder barrel 14 through inlet 16, and the screws advance material in barrel 14 toward the die section. The temperature of extruder apparatus 10, friction between the flowing mixture in barrel 14 and components of extrusion apparatus 10, and the action of the screws creates pressure within apparatus 10. The food mixture is mechanically worked at high temperatures by the rotating screws until the food mixture essentially flows in a fluid manner through barrel 14. After flowing to an end of barrel 14, the food mixture exits through one or more openings extending through the die section. As the fluid mixture, sometimes referred to as a "melt", exits the extruder die section, the melt is suddenly exposed to atmospheric pressure, and gases formed in the melt are released or flashed from the extruded product, causing the extrudate to rapidly expand and form a porous solid product. In an alternative embodiment, a single screw extrusion apparatus, as is well known in the art, may be used.

For complete and balanced nutrition, pet foods are generally formulated from carbohydrates, proteins, fats, vitamins and minerals. Various ingredients to supply these basic components of pet food formulations are mixed and blended, moistened, and processed with extrusion apparatus 10 to produce pet food. The relative proportions of carbohydrate and protein in a given pet food formulation determine the characteristics of the continuous melt and the binding of materials in extrusion apparatus 10, thereby determining the strength and hardness of the extrudate in the manufacturing process.

Carbohydrates for pet food formulations are generally supplied by starch. For example, corn and wheat, and in particular corn and wheat flour, are adequate sources of starch. Alternatively, barley, oats, sorghum, and tapioca, typically in milled form, may supply starch for pet food formulations together with other known carbohydrate sources. In addition, these and other protein sources may be supplied in combination to provide carbohydrates for pet food formulations.

Protein for pet food formulations are generally supplied by animal meat solids obtained from slaughter houses, such as poultry meal, meat meal and fish meal. Other sources of protein include dried cattle blood meal, defatted soy meal or soy flour and other known protein sources.

Fat for pet food formulations may be supplied by liquid and soluble fatty acids and free fatty acids, animal fat (tallow, white grease, yellow grease), vegetable oils (soybean oil, palm oil, cottonseed oil, sunflower oil) and other known fat sources. In addition, other pet food formulation components, such as protein material (e.g., meat meal) may contain indigenous amounts of fat to be considered in formulating a pet food. Fats and oils lubricate the compressed polymer mix in extruder apparatus 10 and modify end product properties and eating qualities of the extruded products.

Known vitamins, minerals, preservatives, binders and filler materials may additionally be employed in a pet food formulation mix, either before or after processing in extrusion apparatus 10.

As noted above, recent advances in pet nutrition have made pet food formulas with increased portions of protein and fat desirable in both special needs diets as well as in starter diets for young pets. High protein (e.g., more than about 50 weight %) and high fat (e.g., less than about 27 weight %) pet food, however, is problematic to manufacture. High protein and high fat content pet food, due to increased protein and fat content, have lower carbohydrate content (e.g., less than 20 weight %). The low carbohydrate content adversely affects the extrudate so that it will not hold together as it exits extrusion apparatus 10 and expands. Solid formation of the pet food product is frustrated, and a friable extruded product is produced that is subject to excessive breakage during subsequent processing and handling of the product. For example, the extrudate for high protein and high fat formulations has been found to crumble when transported to a dryer, and to be generally unsuitable for post-extrusion processes such as palatability coatings. Despite these issues, high protein and high fat pet food may nonetheless be manufactured according to the system and methods described below.

Figure 2:
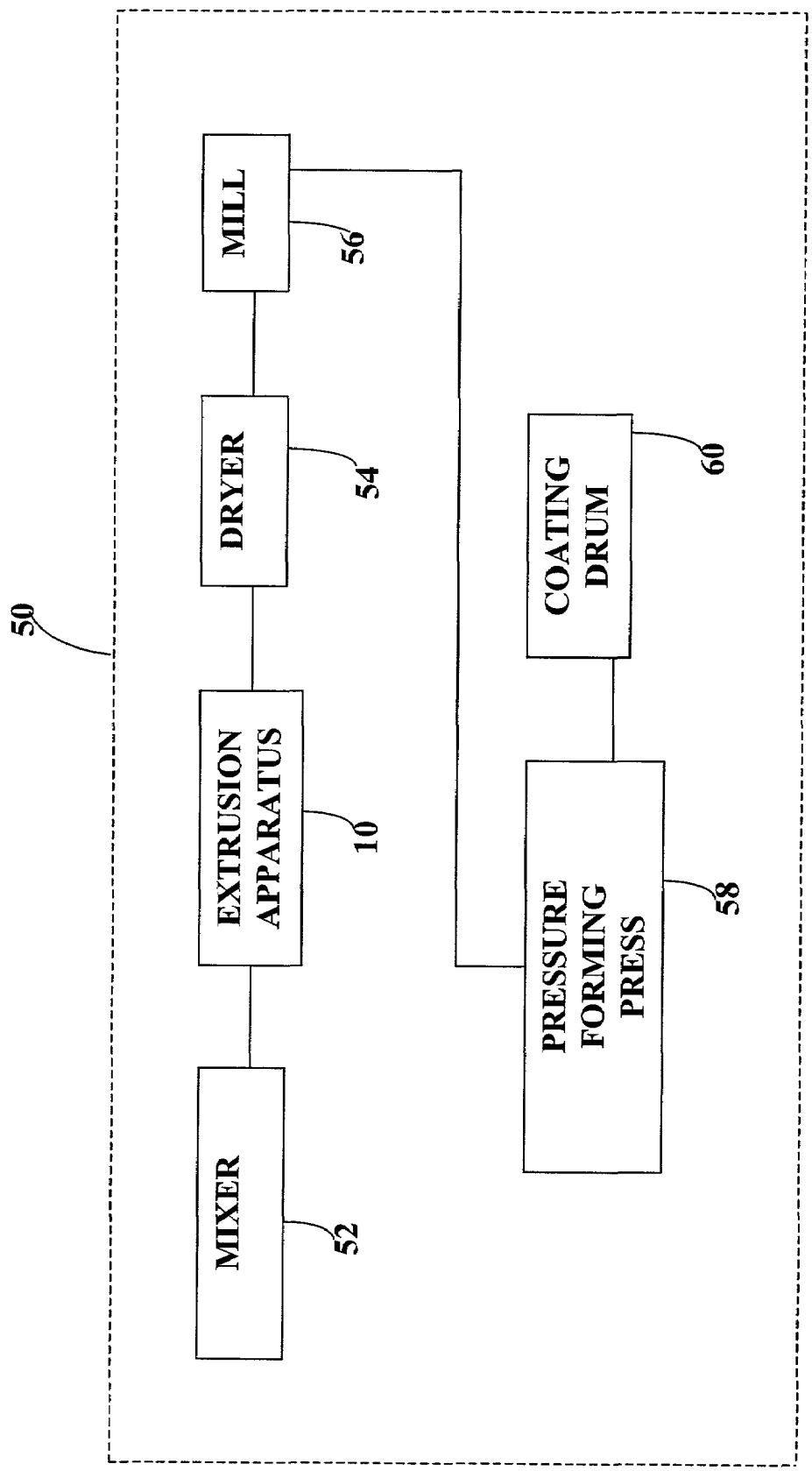
FIG. 2 is a schematic diagram of a system for manufacturing pet food.

FIG. 2 is a schematic diagram of a system 50 arranged for manufacturing high protein and high fat pet food. System 50 includes a mixer 52 for batching the pet food formulation, extrusion apparatus 10 (shown in FIG. 1), a dryer 54, a mill 56, a pressure forming press 58, and a coating drum 60.

System 50 may be assembled from commercially known and available components. Mixer 52 may be, for example, a commercial 3000 lb capacity Mark mixer. Dryer 54 may be, for example, a Proctor Schwartz steam fired dryer. Mill 56 may be for example, a commercial milling machine available from Bliss Industries, Inc of Ponca City, Okla. Pressure forming press 58 may be, for example, a Colton 216 Tableting Press. Coating drum 60 may be, for example, a known apparatus for applying palatability enhancers to formed pet food. Extrusion apparatus 10 may be, for example, an apparatus as described above in relation to FIG. 1. It is believed that the foregoing and other similar components capable of manufacturing pet food according to the method described below are readily appreciated to those in the art without further explanation.

System 50 is implemented and operated according to known process control systems and techniques to efficiently produce stable, solid, high protein and high fat pet food capable of withstanding complete manufacturing operations and subsequent handling of the product without excessive breakage. Also, it is understood that system 50 may include chutes, conveyors, hoppers, feeder mechanisms and other transport equipment to locate pet food at appropriate points in system 50 during manufacturing operations and to properly load the components of system 50 for processing. Additionally, atomizers, moisteners, etc. may be included within system 50 as those in the art may appreciate.

Figure 3:
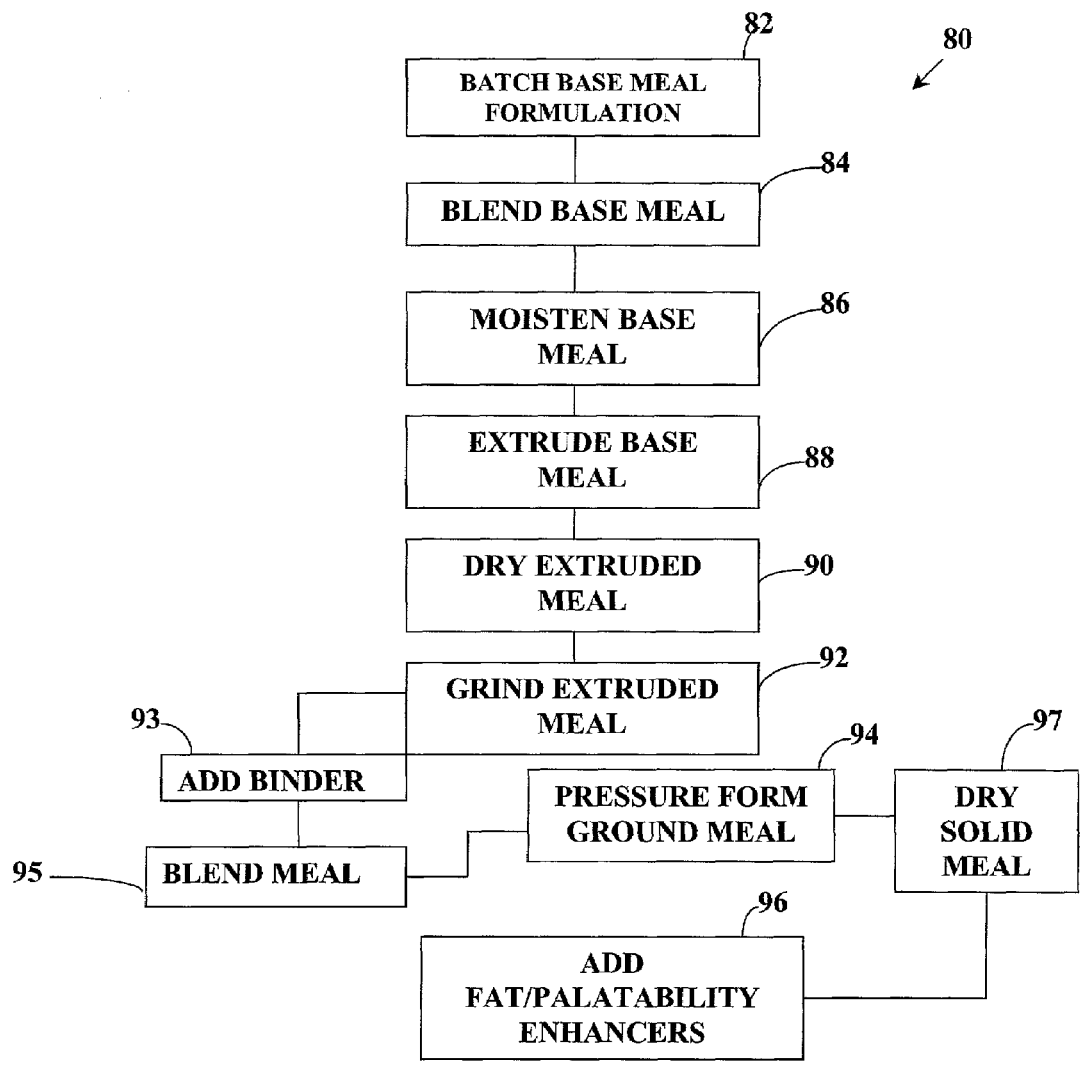
FIG. 3 is a method flow chart of a method for manufacturing pet food according to an exemplary embodiment of the invention.

FIG. 3 is a flow chart of a method 80 for manufacturing pet food according to an exemplary embodiment of the invention. Method 80 utilizes extrusion techniques and a "cake-mix" approach to successfully form high protein and high fat pet food. By extruding a high protein and fat formulation and grinding the friable extrudate into a cake mix, an acceptable pet food product may be formed from the cake mix with known pressure forming techniques. This general methodology is utilized to produce pet foods having up to 70 weight % protein content, up to 27 weight % fat content, and up to 100 weight % carbohydrate (e.g., starch) content. More specifically, the methodology may be utilized to produce dry pet foods with a protein content of greater than about 50 weight %, an overall fat content of less than about 27 weight % and a low carbohydrate content of less than about 20 weight %. An exemplary pet food product contains a protein content of about 55-56%, an overall fat content of about 18.5 weight %, and a carbohydrate content of about 17 weight %. Method 80 provides a texture not found in conventional extruded pet foods. In an alternative embodiment, the pet food has a protein content between about 0% and about 50%. More specifically, et food having a protein content of about 25% to about 30% can be manufactured using the below described process.

Generally, and referring to FIG. 3, method 80 includes batching 82 the food formulation ingredients and blending 84 the ingredients into a meal with mixer 52 (shown in FIG. 2). Once blended 84, the meal is moistened 86 and extruded 88, such as with extrusion apparatus 10 (shown in FIG. 1). An unstable, friable, extrudate is produced from the extruder die section, and the extrudate is dried 90 in dryer 54 (shown in FIG. 2). The dried extrudate, in the form of powder, crumbs, shreds, and flakes, is ground 92 with mill 56 (shown in FIG. 2), and the milled extrudate is then pressure formed 94 with tableting press 58 (shown in FIG. 2) into solid tablets. The tablets are then coated 96 with fat and palatability enhancers using a stub coating drum (shown in FIG. 2).

Batching 82 the meal includes gathering the necessary ingredients, such as some of those described above, to satisfy a particular pet food formulation, and mixing the ingredients similar to conventional extrusion processes for forming pet food. In one example, ingredients per unit weight for forming a saleable high protein (e.g., greater than about 54%), high fat (e.g., about 18.5%) meal includes the following:

| INGREDIENT | UNIT WEIGHT |
|---|---|
| Supro 620 | 27.78 |
| Corn Gluten Meal (60%) | 13.33 |
| Poultry Meal | 37.74 |
| Brewers Rice | 8.94 |
| Edible Tallow | 4.44 |
| Other Ingredients | 7.77 | where Supro 620 is an edible soy protein available from Protein Technologies International, Inc of St. Louis, Mo. and "Other Ingredients" include binders, vitamins, minerals, and preservatives. As those in the art may appreciate, the above described meal formulation has a high protein, high fat content with relatively low carbohydrate content relative to known extruded dry pet foods.

In an exemplary embodiment, and with the exception of the tallow and possibly some of the "other" ingredients, the ingredients set forth above are batched 82 and blended 84 into a base meal with mixer 52 (shown in FIG. 2) in a 3000 lb batch size and fed to extrusion apparatus 10 (shown in FIG. 1). In one example, the ingredient blend is extruded 88 at a dry base meal rate of 2500 lb/hr, moistened at a water rate of 0.79 gpm, and extruded at a steam rate of 304 lb/hr with a screw rate of 230 rpm. More generally, extrusion apparatus meal rates of 2500-3000 lb/hr may be employed, extrusion moisture contents of 22-43% may be employed, and screw speeds of 66 to 300 rpm may be employed in various embodiments. The extrudate is passed to dryer 54 (shown in FIG. 2) and dried 90.

Continuing with the foregoing example, the dried base meal extrudate is ground 92 with mill 56 (shown in FIG. 2) and passed through a Bliss mill #4 screen at 60 Hz to obtain a dry ground powder having a Modulus of Fineness (MOF) of about 100 to about 200 as defined by the American Society of Agricultural Engineers. In one embodiment, the meal is ground to a powder having a MOF of about 160 to about 180. A one percent Collagen binder, such as Protein Plus available from Cra-Vac Industries Inc. of Toronto, Canada, is added 93 to the ground meal. The meal, including the Collagen binder, is again blended 95 and fed to pressure forming press 58 (shown in FIG. 2).

The ground meal is pressure formed 94 as follows in one example. The blended meal is fed to pressure forming machine 58 at a rate of 365 grams of meal per minute with a feeder associated with pressure forming machine. The meal is slightly hydrated with an atomizer, such as, for example, at a rate of 27-28 grams of water per minute. The meal then enters a tabletizer press and is pressure formed 94 into solid tablets at a rate of 250 to 500 tablets per minute at a pressure of about 6000 pounds per square inch. Solid tablets are thus pressure formed 94, each tablet weighing approximately one gram each in an exemplary embodiment. Once formed, the tablets are taken to dryer 54 (shown in FIG. 2) and dried 97 to a tablet moisture content of about 8%.

The above-described process 80 results in stable tablets that do not break or fall apart in subsequent handling. For example, the tablets may be sprayed and/or coated 96 with fat and palatability enhancers, such as an 8% by weight tallow coating in a batch size of four pounds, without crumbling. Further, once completed, pet food product may be packaged and shipped without excessive breakage.

Palatability tests indicate no significant palatable differences between comparable extruded pet foods according to conventional extrusion processes and pressure formed food. In addition, and as noted above, pressure forming of food provides a unique texture that is not found in conventional extruded foods.

While the invention has been described in terms of various specific embodiments, those skilled in the art will recognize that the invention can be practiced with modification within the spirit and scope of the claims.

What is claimed is:

1. A method for manufacturing pet food comprising:
   extruding a base meal formulation comprising a carbohydrate content of less than about 20 weight %, a protein content of greater than about 50 weight %, and a fat content of less than about 27 weight %;
   grinding the extruded meal; and
   pressure forming the ground meal into solid form in a tableting press.

2. A method in accordance with claim 1 wherein extruding a meal comprises extruding a meal having a protein content of less than about 70 weight %.

3. A method in accordance with claim 1 wherein extruding a meal comprises extruding a meal having a fat content of less than about 12 weight %.

4. A method in accordance with claim 1 further comprising coating the solid form with a palatability enhancer.

5. A method for forming a pet food in accordance with claim 1 further comprising adding a binder to the ground meal.

6. A method for manufacturing dry pet food having a carbohydrate content of about 20 weight % or less, said method comprising:
   batching ingredients of a meal having approximately 20% or less carbohydrate content by weight;
   extruding the batched meal into an extrudate meal;
   grinding the extrudate meal; and
   pressure forming the ground meal into solid form in a tableting press.

7. A method in accordance with claim 6 wherein grinding the extrudate meal comprises grinding the meal to a Modulus of Fineness of about 100 to about 200.

8. A method in accordance with claim 6 wherein grinding the extrudate meal comprises grinding the meal to a Modulus of Fineness of about 160 to about 180.

9. A method in accordance with claim 6 further comprising coating the pressure formed solid with a palatability enhancer.

10. A method for forming a pet food having a protein content of at least about 50 weight % and an overall fat content of less than about 27 weight %, said method comprising:
    extruding a base meal to produce an extrudate;
    grinding the extrudate meal;
    adding a binder to the ground meal; and
    pressure forming the ground meal into solid form in a tableting press.

11. A method for forming a pet food in accordance with claim 10 wherein pressure forming the ground meal comprises tabletizing the ground meal.

12. A method for forming a pet food in accordance with claim 10 further comprising coating the pressure formed solid with a palatability enhancer.

13. A method in accordance with claim 10 further comprising drying the pressure formed meal to an overall moisture content of about 5 weight % to about 11 weight %.

14. A method in accordance with claim 10 further comprising drying the pressure formed meal to an overall moisture content of about 8 weight %.

15. A method in accordance with claim 9 further wherein extruding a base meal comprises extruding a meal have a protein content of greater than about 54 weight %.

16. An extruded and tabletted pet food product comprising:
    a protein content of at least about 50 weight %;
    an overall fat content of at least about 16 weight %; and
    a carbohydrate content of less than about 20 weight %.

17. A pet food product in accordance with claim 16 wherein the protein content is greater than about 54 weight %.

18. A pet food product in accordance with claim 16 wherein the overall fat content is about 18 weight % to about 25 weight %.

19. A pet food product in accordance with claim 16 wherein the overall fat content is about 18.5 weight %.

20. A pet food product in accordance with claim 16 wherein the carbohydrate content is about 17 weight %.

21. A pet food product in accordance with claim 16 further comprising a binder of about 1 weight %.

22. A tableted pet food product comprising a protein content of at least about 50 weight % and an overall fat content of at least about 16 weight %, said pet food product formed by the process of:

extruding a base meal formulation;

grinding the extruded meal; and utilizing a tableting press to pressure form the ground meal into solid form.

23. A pet food product in accordance with claim 22 further comprising a carbohydrate content of less than about 20 weight %.

24. A pet food product in accordance with claim 22 wherein the protein content is greater than about 54 weight %.

25. A pet food product in accordance with claim 22 wherein the overall fat content is about 18 weight % to about 25 weight %.

26. A pet food product in accordance with claim 22 wherein the overall fat content is about 18.5 weight %.

27. A pet food product in accordance with claim 22 wherein the carbohydrate content is about 17 weight %.

28. A pet food product in accordance with claim 22 further comprising a binder of about 1 weight %.

* * * * *